(12) United States Patent
Venkiteswaran

(10) Patent No.: US 9,070,164 B2
(45) Date of Patent: Jun. 30, 2015

(54) INTEGRATION OF BUY-SIDE PROCUREMENT WITH WEB-ENABLED REMOTE MULTI-FORMAT CATALOG SOURCES

(75) Inventor: Vaidhyanathan Venkiteswaran, West Chester, OH (US)

(73) Assignee: Vinimaya, Inc., Cincinnati, OH (US)

( * ) Notice: Subject to any disclaimer, the term of this patent is extended or adjusted under 35 U.S.C. 154(b) by 152 days.

(21) Appl. No.: 12/833,396

(22) Filed: Jul. 9, 2010

(65) Prior Publication Data

US 2011/0004534 A1    Jan. 6, 2011

Related U.S. Application Data

(62) Division of application No. 10/360,755, filed on Nov. 30, 2001, now Pat. No. 7,756,750.

(60) Provisional application No. 60/336,057, filed on Nov. 30, 2001.

(51) Int. Cl.
| | |
|---|---|
| *G06Q 30/00* | (2012.01) |
| *G06Q 40/04* | (2012.01) |
| *G06Q 30/06* | (2012.01) |

(52) U.S. Cl.
CPC ............ *G06Q 40/04* (2013.01); *G06Q 30/0627* (2013.01); *G06Q 30/06* (2013.01); *G06Q 30/0629* (2013.01); *G06Q 30/0623* (2013.01); *G06Q 30/0625* (2013.01); *G06Q 30/0613* (2013.01); *G06Q 30/0633* (2013.01); *G06Q 30/0641* (2013.01)

(58) Field of Classification Search
CPC .......................................... G06Q 30/00–30/08
USPC ................................................ 705/26.1–27.2
See application file for complete search history.

(56) References Cited

U.S. PATENT DOCUMENTS

| | | | | |
|---|---|---|---|---|
| 5,712,989 | A * | 1/1998 | Johnson et al. | ................. 705/28 |
| 6,119,101 | A | 9/2000 | Peckover | |
| 7,330,846 | B1 | 2/2008 | Dirisala et al. | |
| 2001/0034659 | A1 | 10/2001 | Kobayashi | |
| 2002/0026440 | A1* | 2/2002 | Nair | ................. 707/3 |
| 2002/0038282 | A1 | 3/2002 | Montgomery | |
| 2002/0065744 | A1 | 5/2002 | Collins | |

(Continued)

OTHER PUBLICATIONS

"Glovia Rolls Out a Powerful, Web-Enabled Configuration Solution." Business Editors and High-Tech Writers. Business Wire. New York: May 16, 2001, p. 1. [Provided in parent application].*

(Continued)

*Primary Examiner* — Michael Misiaszek
(74) *Attorney, Agent, or Firm* — Finnegan, Henderson, Farabow, Garrett & Dunner LLP

(57) ABSTRACT

A request for shopping is placed from inside a procurement system. Intelligent agents are launched to retrieve information from catalog sources web-enabled over the internet or within the intranet. Retrieved catalog information is aggregated and associated with other data items. Business rules are applied to make decisions on what part of aggregated information will be rendered to a User. Sorting/multi-level refining operations are enabled. The User selects one or more catalog results, whereupon an XML shopping cart is created and submitted to the procurement system through published interfaces. The procurement system is enabled to place an order on supplier web-enabled transaction systems.

5 Claims, 2 Drawing Sheets

VINISYNDICATE AND CATALOG SOURCES

(56) References Cited

U.S. PATENT DOCUMENTS

| | | | |
|---|---|---|---|
| 2002/0077929 A1 | 6/2002 | Knorr et al. | |
| 2002/0147656 A1 | 10/2002 | Tam et al. | |
| 2002/0194208 A1 | 12/2002 | Knoll et al. | |
| 2003/0030672 A1 | 2/2003 | Hughes et al. | |
| 2003/0061122 A1 | 3/2003 | Berkowitz et al. | |
| 2003/0084010 A1 | 5/2003 | Bigus et al. | |
| 2003/0105681 A1 | 6/2003 | Oddo | |
| 2003/0167209 A1 | 9/2003 | Hsieh | |
| 2004/0167827 A1* | 8/2004 | Vincent et al. | 705/26 |
| 2005/0027611 A1* | 2/2005 | Wharton | 705/26 |
| 2005/0261984 A1 | 11/2005 | Hutchison et al. | |

OTHER PUBLICATIONS

"Glovia Rolls Out a Powerful, Web-Enabled Configuration Solution." Business Editors and High-Tech Writers. Business Wire. New York: May 16, 2001. p. 1. Retrieved via ProQuest on Feb. 27, 2010.
htlp://findarticies.com/p/articles/mi_mOEIN/is_2000_Nov_6/ai_66626613/, "Vinimaya Expands B2B e-Procurement Platform to 20 Verticals; B2B Marketplaces and Suppliers Can Join the Network to Instantly Reach Fortune 2000 Purchasing Managers," Business Wire, Nov. 6, 2000 (pp. 1-3).
htlp://findarticies.com/p/articles/nnLmOEIN/is_2000_0ct_11/aL65946458/, "Vinimaya Partners with AnswerPal to Establish B2B Content Development Arm," Business Wire, Oct. 11, 2000, (pp. 1-2).
htlp://findarticles.com/p/articles/mi_hb5932/is_20011 0/ai_n23885081/, Vinimaya Upgrades ViniSyndicate. (Brief Article)(Product Announcement), The Online Reporter, Oct. 15, 2001 ,(po 1).
htlp://findarticles.com/p/articles/mi_hb3381/is_200011/aLn8119940/, Vinimaya Inc. (business to business online shopping services), Purchasing, Nov. 16, 2000 (p. 1).
Vinimaya website screenshots, Vinimaya website, purported 2000, pp. 1-3.
htlp:/lkapowtech.com/index.php/about-us, "About Kapow Technologies," Kapow Technologies website, 2009.
htlp:/lwww.inc.com/inc5000/2008/company-profile.html?id-200836760, "Company Profile," Inc. 5000, 2009.
Letter from PurchasingNet, Inc., May 24, 2006 (4 pages).

* cited by examiner

INTEGRATION OF BUY-SIDE PROCUREMENT WITH WEB-ENABLED REMOTE MULTI-FORMAT CATALOG SOURCES

This is a division of application Ser. No. 10/360,755, filed Nov. 30, 2001 now U.S. Pat. No. 7,756,750, which was converted to a nonprovisional application from U.S. provisional Application No. 60/336,057, filed Nov. 30, 2001, all of which are incorporated herein by reference.

FIELD OF THE INVENTION

This invention relates to computer-based on-line procurement, where users of a buy-side procurement system can perform shopping from non-resident, distributed web-enabled catalogs.

DESCRIPTION OF RELATED ART

Lack of Supplier "electronic" Product Catalogs, or eCatalogs resident in buy-side procurement systems has created a seemingly insurmountable bottleneck for Buyers automating procurement and supply chain processes. Companies have implemented expensive buy-side applications only to discover that a mere fraction of their Supplier base can support their automation efforts without a substantial investment of both time and money. Thus, these companies may have only 5 or 10 Supplier eCatalogs resident in buy-side e-procurement systems, out of thousands of available Suppliers, limiting the number of transactions through these applications and becoming a significant hurdle in achieving their hoped-for return on investment.

Making matters worse, there are numerous manufacturers and distributors willing to provide their product information to their customers via eCatalogs. However, with multiple and disparate eCatalog formats (such as CIF, ebXML, xCBL and others), syndication approaches (e.g., OBI, cXML "punchout"), technologies (e.g., XML, EDI), and taxonomies (e.g., UNSPSC, eClass) available, only a small minority of these Suppliers have the financial resources and technical skills to meet each customer's unique needs.

Although the majority of Supplier web sites have basic product information and list pricing, they can't meet the Buyer's requirements for aggregation and user interface standardization, buyer-specific attributes such as pricing, part numbers, UNSPSC codes, integration with their eProcurement system. The bottom line is the lack of supplier catalogs available to eProcurement Systems limits transaction liquidity, seriously affecting expected savings and ROI!

BRIEF SUMMARY OF THE INVENTION

The ViniSyndicate product is a unique combination of cutting-edge technology (Intelligent Agents) applied in an innovative process (Dynamic Syndication) to solve the problem of lack of buy-side resident eCatalogs. The innovative process involves a server-resident software system that links-up with buy-side procurement system, and utilizes Intelligent Agents to execute distributed search requests over the Internet to search for and securely access product, price, availability and other relevant content directly from Suppliers' web sites or eCommerce Systems. With superior abilities to search, aggregate, customize, enhance, analyze, display and manage eCatalog content, ViniSyndicate meets the Buyer's needs, protects their current eProcurement investment and concurrently minimizes/eliminates effort for their Suppliers.

DETAILED DESCRIPTION OF THE INVENTION

Figure 1:
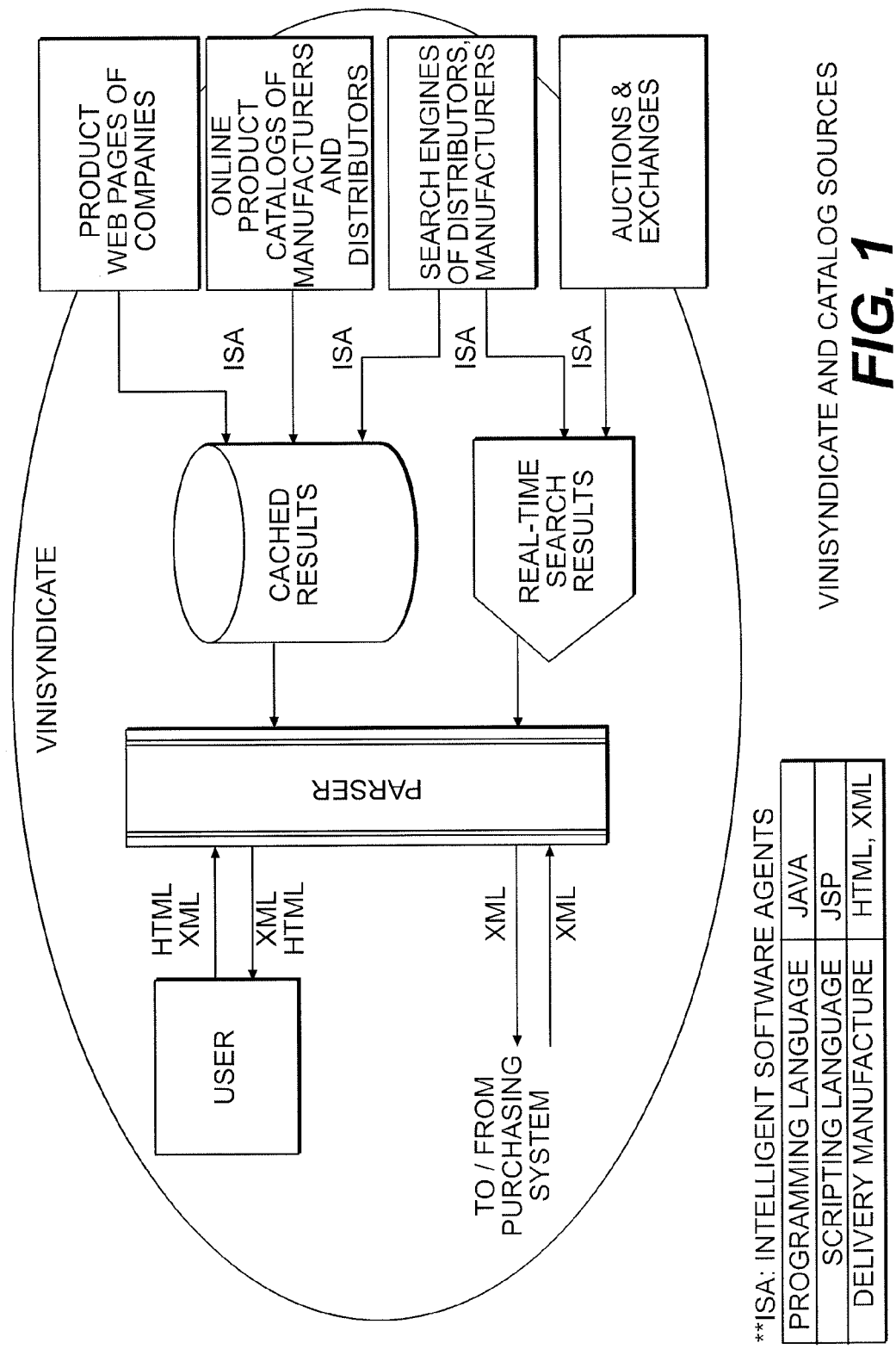
FIG. 1: ViniSyndicate and Catalog Sources, illustrates the kinds of catalog sources that ViniSyndicate can integrate to and the two models in which the catalog results can be made available to the end user (e.g. real-time and/or cached).
Figure 2:
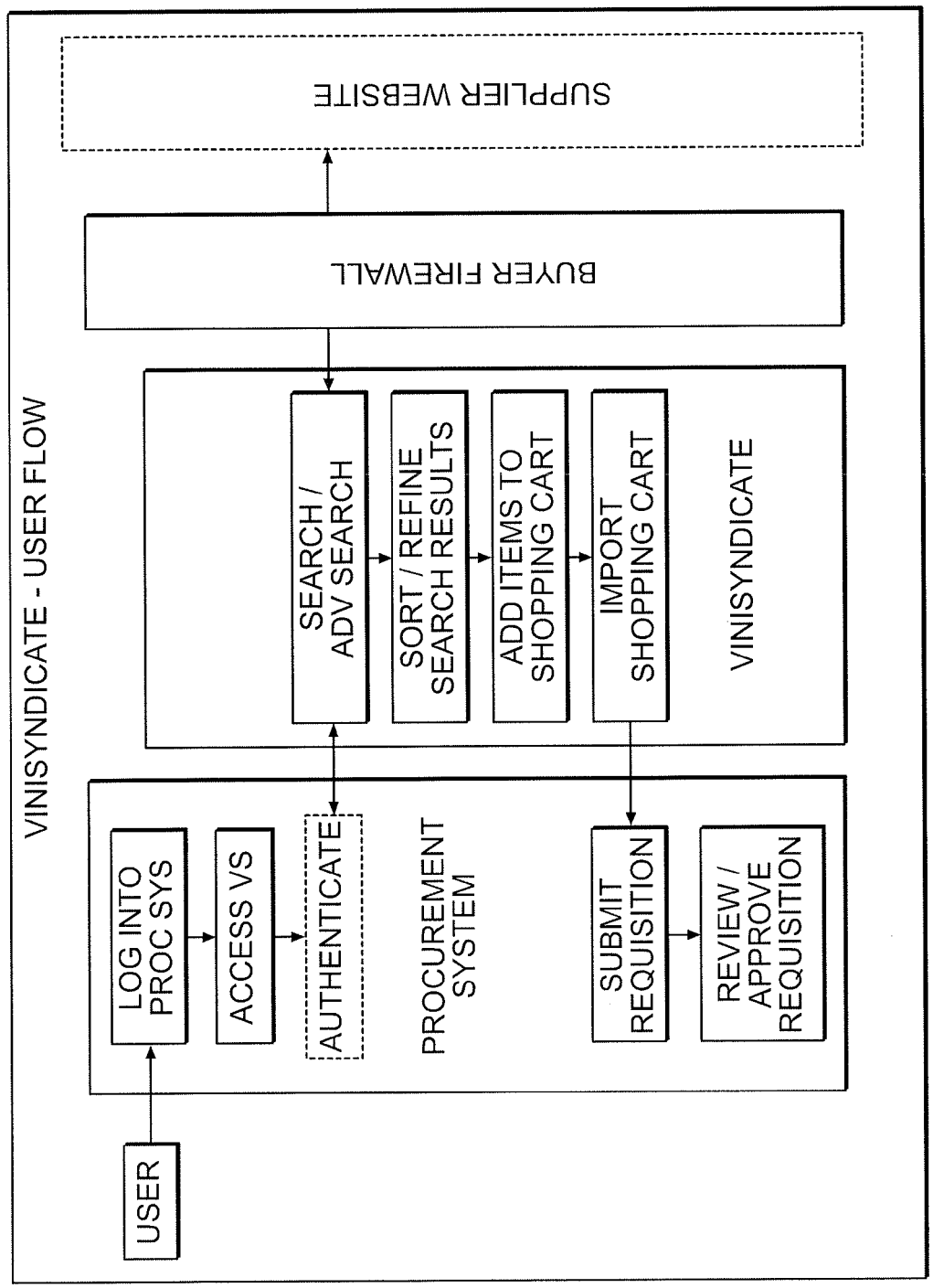
FIG. 2: ViniSyndicate User flow, illustrates how ViniSyndicate (hence forth referred to as VS) works in concert with the Buy-side procurement system.

Vinimaya Inc. is a privately held software company with a focus to develop and bring to market innovative eBusiness software products based on Intelligent Agent Technology. Its products are based on over 3 years of R&D, are built upon standard technology platforms such as Java and XML, and are designed to be easy to implement, maintain and operate. Vinimaya's flagship product "ViniSyndicate" is a buy-side eCatalog Management System that uses Intelligent Agent Technology to extract dynamic, real-time product information directly from Suppliers' web sites as they exist today, without the need for "XML punchout" and other costly, invasive modifications. This document explains the motive, architecture and technologies behind the product ViniSyndicate developed and marketed by this company.

ViniSyndicate is a buy-side software solution, built on intelligent agent and XML technology, that enables a buy-side procurement system to be integrated with a supplier's web presence without the need for implementation of expensive sell-side punchout solutions by the supplier. A user on the buy-side procurement system would be able to dynamically convert catalog information resident on a supplier's web site (or other web-enabled sources) into an XML shopping cart that could be fetched into the procurement system.

The solution combines a rich user experience associated with shopping on a supplier's web site with the necessary buy-side control that a sourcing professional would need over what a general requisitioner would be allowed to purchase. The features include live catalog content from supplier's web site, use of Intelligent Agents for standardizing supplier catalog content, powerful, distributed search engine, dynamic XML cart generation, out-of-box integration with major procurement systems, catalog management tools addressing buy-side needs such as SKU restriction, UNSPSC codes and buyer part numbers, buyer specific product and pricing information, customizable User Interface with built-in Graphical User Interface (GUI) adaptors.

ViniSyndicate is a non-invasive approach to buyer-supplier relationship, using dynamic XML as a means of integration. This approach minimizes the time-to-deploy and time-to-ROI when compared to alternate approaches. The ViniSyndicate Dynamic Syndication functionality allows users to take advantage of supplier hosted catalogs directly from the supplier's web site. The system provides transport and translation of data from the supplier to buy-side procurement system. It is written in Java and XML, runs on both Microsoft and Unix server platforms, and is compatible with all leading web application servers. ViniSyndicate's unique functionality is derived by combining five major components into a single, integrated, highly scalable software application. Listed below are the five major components of ViniSyndicate. . .

Component #1 is the Intelligent Agent Engine which retrieves product information, pricing, availability and other relevant information in real-time, directly from Suppliers' web sites, eCommerce systems or other web-accessible sources using secure, standard open-system HTTP/HTTPS protocol.

Component #2 is the Distributed Remote Search Engine, which performs remote searches on web-enabled, non-resident, distributed catalog sources. Also uses multi-tier searching techniques, which can utilize supplier web site search engine or configurator and supports parametric searching with relevancy.

Component #3 is the Parsing Engine, which turns unstructured, multi-format web site content into aggregated, structured eCatalogs and has a flexible, user-defined data structure.

Component #4 is the eCatalog Engine which is Configurable and customizable and allows buy-side to define attributes, navigation, add buyer part numbers, UNSPSC codes, custom pricing including buy-side to add discounts, price breaks.

Component #5 is the XML Engine used for storing, reading, parsing, mapping and rendering and syndicating XML (eXtensible Markup Language) "documents" and integrates seamlessly with published interfaces from leading buy-side eProcurement products from Ariba, Oracle, SAP, etc. via published XML interfaces such as cXML and OCI.

Implementing ViniSyndicate allows Buyers to implement supplier catalogs in days versus months or even years. ViniSyndicate is a unique, robust and cost-effective eCatalog solution that simplifies and accelerates Supplier participation, quickly increasing transaction liquidity and driving return-on-investment! They can quickly aggregate eCatalogs from hundreds (if not thousands) of Supplier catalog sources which will increase "transaction liquidity" and drive savings. ViniSyndicate fully integrates with leading buy-side eProcurement and Supply Chain Management Products "out-of-the-box".

Also, companies now get robust eCatalog management capabilities with less cost, less complexity because ViniSyndicate eliminates the need (and costs) for maintaining a large internal eCatalog data warehouse, eliminates data-transformation" costs (range from $4 to $10 per catalog line item) and requires less hardware, software, storage, outside services, people required than conventional solutions.

For Suppliers' participation in a customer's eProcurement program is simplified because there are almost no technical requirements for them when compared to conventional solutions. ViniSyndicate Intelligent Agents build a powerful bridge between the Buyers' eProcurement platforms (e.g., Ariba Buyer, SAP B2B, Oracle iProcurement, etc.) and Suppliers' web sites and other eCommerce systems. This leverages the Suppliers' existing eCommerce environment, without requiring additional investment and extensive effort on their part to meet each Buyer's specific eCatalog needs. (Estimates for punchout-enabled web sites>$100,000 per site). No need for Suppliers to support dozens of catalog formats—cXML, xCBL, EDI 832, etc. Immediate buy-side access to "real-time" information such as product availability and inventory overruns.

Despite using the supplier's web site, the Buyer still controls the process and can configure and administer the eCatalog user interface, add or remove catalogs quickly and easily, and add their own Buyer-specific, value-added information—part numbers, contract pricing, etc.

Intelligent Agents are software entities that can act on behalf of a user or a system. Simply put, the central idea underlying Intelligent Agents is "delegation". Most Intelligent Agent-based software applications in use today are designed to find and filter information, automate tasks, and communicate with systems, much like an end user would. They can be found in many of the Internet search engines in use today (e.g., Google, Ask Jeeves) as well as in many network management systems (e.g., CA Unicenter). These types of agents are designed to be very task-specific and work in a well-defined environment.

The class of Intelligent Agents used in Vinimaya's products goes to the next level of performance and capability. In addition to being able to perform the aforementioned tasks (find and filter data, automate processes, etc.), the agents are now able to apply rules within the domain of their application. This capability allows the agents to deal with the non-standard and unstructured world of B2B eCommerce, where inconsistent data formats, disparate protocols, incompatible systems and subjective information is the norm. Additionally, Vinimaya products are considered "multi-agent systems", which means that the agents can collaborate with other agents within the environment—a very complex concept to implement into a commercial product—it is also very powerful when efficiency, speed and accuracy are the priority, which is always the case in B2B eCommerce.

In their current application in Vinimaya's ViniSyndicate eCatalog Management System, the Intelligent Agents are configured to interact with Supplier web sites and eCommerce systems on behalf of the Buyer, automating the locating, translating, enhancing and organizing of product information as required by the Buyer's eProcurement system. This real-time approach is significantly easier and faster to deploy than today's current static data-intensive approaches.

A User on the browser-based procurement system could get to VS by clicking on an external catalog source link named ViniSyndicate (Most procurement systems provide this functionality to access an external catalog source). Once in VS, the User can search across multiple supplier catalogs categorized under standard commodity groups. The search results could be sorted, and the User can refine the set of results to find exactly what he/she is looking for. The User can then add the items to a shopping cart, and can either continue shopping on VS or return back with the cart into the procurement system. Once back on procurement system, the User proceeds with the usual workflow associated with creating a purchase requisition for approval.

Glossary

Java™—Java is a programming language expressly designed for use in the distributed environment of the Internet. It was designed to have the "look and feel" of the C++ language, but it is simpler to use than C++ and enforces an object-oriented programming model. Java can be used to create complete applications that may run on a single computer or be distributed among servers and clients in a network. It can also be used to build a small application module or applet for use as part of a Web page.

JavaBeans™—The JavaBeans component architecture is the platform-neutral architecture for the Java application environment. It's the ideal choice for developing or assembling network-aware solutions for heterogeneous hardware and operating system environments—within the enterprise or across the Internet. The JavaBeans component architecture extends "Write Once, Run Anywhere™" capability to reusable component development. Software components that use JavaBeans are thus portable to containers including Internet Explorer, Visual Basic, Microsoft Word, Lotus Notes, and others. The JavaBeans specification defines a set of standard component software APIs for the Java platform.

JavaServer Pages™ (JSP™)—JavaServer Pages technology is aimed at creating WebPages that are information rich and dynamic. JavaServer pages technology is an extension of the Java™ technology. JSP technology enables rapid development of web-based applications that are platform independent. JavaServer Pages technology separates the user interface from content generation enabling designers to change the overall page layout without altering the underlying dynamic content. JavaServer Pages technology uses tags and scriptlets written in the Java programming language to encapsulate the logic that generates the content for the page. Additionally, the application logic can reside in server-based resources like JavaBeans™ component architecture. By separating the page logic from its design and display and supporting a reusable component-based design, JSP technology makes it faster and easier than ever to build web-based applications.

Java Database Connectivity (JDBC)—JDBC is an application program interface (API) specification for connecting programs written in Java to the data in popular database technologies.

Structured Query Language (SQL)—SQL is a language used to interrogate and process data in a relational database. Originally developed by IBM for its mainframes, all database systems designed for client/server environments support SQL. SQL commands can be used to interactively work with a database or can be embedded within a programming language to interface to a database. Programming extensions to SQL have turned it into a full-blown database programming language.

Hyper Text Markup Language (HTML)—HTML is the set of markup symbols or codes inserted in a file intended for display on a World Wide Web browser page. The markup tells the Web browser how to display a Web page's words and images for the user. Each individual markup code is referred to as an element or tag. Some elements come in pairs that indicate when some display effect is to begin and when it is to end. HTML is a formal Recommendation by the World Wide Web Consortium (W3C) and is generally adhered to by the major browsers, Microsoft's Internet Explorer and Netscape's Navigator, which also provide some additional non-standard codes.

Extensible Markup Language (XML)—XML is a set of rules for defining semantic tags that break a document into parts and identify the different parts of the document. It is a meta-markup language that defines a syntax used to define other domain-specific, semantic, structured markup languages and provides a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Any individual or group of individuals or companies that wants to share information in a consistent way can use XML.

JavaScript—JavaScript is the scripting language of the Internet. It is the most popular scripting language on the World Wide Web and is used in millions of Web pages to power rich, interactive content and increasingly powerful web applications. JavaScript is the "glue" that binds together HTML and XML elements accessed through the browser's Document Object Model (DOM), JavaScript scripts, Java applets, and plug-ins and allows these objects to communicate and interoperate. JavaScript can be used both on the client (CSJS) and on the server (SSJS). The JavaScript language can also be used across browsers, applications, platforms, and devices, making it the language of choice for building next-generation web applications.

What is claimed is:

1. A system for dynamically integrating a buy-side procurement system with Web-based catalog sources including content associated with products, comprising:
    a computer system behind a firewall associated with the buy-side procurement system which is connected to a network that is connected to the Web-based catalog sources and the procurement system; the computer system including:
        one or more memories storing software instructions, and
        one or more processors configured to execute the software instructions to perform operations including:
            receiving a query for a product from the procurement system:
            searching, using a plurality of intelligent agents, a plurality of Web-based catalog sources in real-time on behalf of the buy-side procurement system to automatically locate, retrieve, and translate product information from the Web-based catalog sources, wherein the intelligent agents locate, retrieve, and translate product information in response to the query for a product from the procurement system, and wherein the intelligent agents include sub-agents that are generated by at least one of the intelligent agents based on the query for a product from the procurement system,
            locating, retrieving, and translating product information from Web-based catalogs using a distributed remote search, wherein the distributed remote search is configured to utilize supplier search engines;
            automatically, and in real-time, enhancing and organizing the product information retrieved by the distributed remote search and the intelligent agents based on the query parameters provided by the procurement system, wherein the enhancing of the product information includes appending to the product information buyer part number information and contract pricing information generated by the buy-side procurement system which are specific to the buyer, and
            rendering electronic documents including the organized and enhanced product information in the procurement system in a format compatible with the procurement system regardless of the format of the product information retrieved from the Web-based catalog sources.

2. The system of claim 1, wherein the product information includes multi-formatted product information, and the processor is configured to execute software to translate multi-formatted product information and configured to execute software to configure the translated product information into aggregated structured product information and modify the aggregated structured product information based on one or more rules defined by the procurement system.

3. The system of claim 1, wherein the one or more processors are configured to execute the software instructions to receive first product information from a first Web based catalog source that is in a first type of format and to receive second product information from a second Web based catalog source that is in a second type of format that is different from the first format type.

4. the system of claim 1, wherein translating the product information comprises translating the product information into aggregated structured product information such that different formatted product information from one or more of the Web based catalog sources is processed into a single representation of the product information in an aggregated structured format.

5. The system of claim 1, wherein the one or more processors are configured to execute the software instructions to create a shopping cart including the electronic documents in a format compatible with the procurement system and send the shopping cart to the procurement system in response to a request.

\* \* \* \* \*